United States Patent [19]

Treger et al.

[11] Patent Number: 5,681,666

[45] Date of Patent: Oct. 28, 1997

[54] LIGHT TRANSPARENT MULTILAYER MOISTURE BARRIER FOR ELECTROCHEMICAL CELLTESTER AND CELL EMPLOYING SAME

[75] Inventors: Jack Treger, Quincy; Bryan Christopher Lagos, Needham, both of Mass.; John B. Fenn, Suffield, Conn.; H. Frank Gibbard, Wellesley; Guang Wei, Somerville, both of Mass.

[73] Assignee: Duracell Inc., Bethel, Conn.

[21] Appl. No.: 695,092

[22] Filed: Aug. 8, 1996

Related U.S. Application Data

[62] Division of Ser. No. 376,274, Jan. 23, 1995, Pat. No. 5,607,789.

[51] Int. Cl.$^6$ .................................................. H01M 10/48
[52] U.S. Cl. .......................... 429/90; 324/435; 340/646; 429/93
[58] Field of Search .............................. 429/90, 92, 93; 324/435; 340/646

[56] References Cited

U.S. PATENT DOCUMENTS

| 4,543,275 | 9/1985 | Akashi et al. | 427/250 |
|---|---|---|---|
| 4,723,656 | 2/1988 | Kiernan et al. | 206/333 |
| 5,032,461 | 7/1991 | Shaw et al. | 428/461 |
| 5,188,231 | 2/1993 | Kivell et al. | 206/333 |
| 5,250,905 | 10/1993 | Kuo et al. | 324/435 |
| 5,339,024 | 8/1994 | Kuo et al. | 324/435 |
| 5,355,089 | 10/1994 | Treger | 324/435 |
| 5,418,086 | 5/1995 | Bailey | 429/93 |
| 5,543,246 | 8/1996 | Treger | 429/90 |
| 5,554,460 | 9/1996 | Wu et al. | 429/210 |

FOREIGN PATENT DOCUMENTS 0523901  1/1993  European Pat. Off. .

*Primary Examiner*—M. Nuzzolillo
*Attorney, Agent, or Firm*—Barry D. Josephs; Paul I. Douglas

[57] ABSTRACT

A light transparent moisture barrier useful for preventing moisture from destroying the effectiveness of a moisture sensitive cell condition tester on an electrochemical cell comprises a plurality of very thin; alternating layers of an inorganic material and an organic material on a flexible, polymeric substrate. The layers are not laminated, but are formed on the substrate by a deposition or coating process and the thickness of any layer is less than 5 microns. The organic material is a hydrophobic polymer and the inorganic material is a metal oxide, nitride, a glass or silicon,

19 Claims, 1 Drawing Sheet

LIGHT TRANSPARENT MULTILAYER MOISTURE BARRIER FOR ELECTROCHEMICAL CELLTESTER AND CELL EMPLOYING SAME

This application is a division of application Ser. No. 08/376,274, filed Jan. 23, 1995, now U.S. Pat. No. 5,602,289.

BACKGROUND OF THE INVENTION

1. Field of the Invention

This invention relates to a light transparent, multilayer moisture barrier. More particularly, this invention relates to a light transplant, thin film, multilayer composite comprising a plurality of alternating layers of a inorganic material and an organic material useful as a moisture barrier for a moisture sensitive on-cell tester, a process for making said barrier and to an electrochemical cell having a moisture sensitive on-cell tester and said barrier.

2. Background of the Disclosure

The use of cell condition testers, such as thermochromic voltage testers, to visually indicate the condition of an electrochemical cell, commonly referred to as a battery, has become very popular and provides a value added advantage to the battery manufacturer and to the consumer. These testers are used with primary electrochemical cells, although they can also be used by consumers to test the condition of a secondary or rechargeable electrochemical cell if desired. The most popular tester presently in use is a thermochromic material in contact with an electrical resistance element which forms an integral part of a battery package in which the batteries are alkaline primary cells. The user places the terminals of the cell between the contacts of the tester and squeezes the contact ends of the tester to make electrical contact with the cell terminals which are the ends of the cell. The resistance element of the tester is heated in proportion to the cell voltage and the thermochromic material provides a qualitative indication of the condition of the cell over a range indicating "good" or "replace". This kind of tester is disclosed, for example, in U.S. Pat. No. 4,723,656. An integral, thermochromic package tester which can also be removed from the package is disclosed in U.S. Pat. No. 5,188,231. More recently, on-cell testers have been developed in which the cell condition indicator is an integral part of the cell label. These on-cell testers include both the thermochromic type and a new, electrochemical type of tester. An example thermochromic type of on-cell tester is disclosed in European Patent Publication No. 0 523 901 A1, the disclosure of which is incorporated herein by reference. Unlike the thermochromic type which employs a resistance element to produce heat and which can therefore not be permanently attached to the terminals of the cell without continuously discharging it, the new electrochemical type does not draw current from the cell and can therefore be permanently attached to the terminals of the cell without discharging the cell. This new type of tester is disclosed in U.S. Pat. Nos. 5,250,905 and 5,339,024 the disclosures of which are incorporated herein by reference. As is disclosed in U.S. Pat. No. 5,355,089 some electrochemical types of on-cell condition testers employ hygroscopic or otherwise moisture sensitive electrolyte compositions and means are necessary to prevent moisture from reaching the electrolyte which will impair the effectiveness of the tester. This patent discloses a number of solutions to this problem, the best of which is mica. However, although relatively inexpensive, mica is not available in long ribbons or other forms which permit it to be rolled into a roll of mica which is needed for economically viable commercial production methods.

SUMMARY OF THE INVENTION

The present invention broadly relates to a light transparent, multilayer composite which is useful as a moisture barrier and which comprises a plurality of alternating layers of a solid inorganic material and a solid organic material, and which is formed by depositing or forming said layers onto a substrate. More particularly, the invention relates to a thin film, multilayer composite which comprises alternating inorganic and organic layers deposited or formed on a suitable substrate and which is useful as a moisture barrier. In one embodiment the composite of the invention is used as a moisture barrier for a moisture sensitive, on-cell tester which visually indicates the condition of an electrochemical cell. In another embodiment the invention relates to a process for making the multilayer composite. In yet other embodiments the invention relates to a multilayer composite moisture barrier of the invention in combination with an on-cell tester and to an electrochemical cell having a moisture sensitive on-cell tester protected from moisture by said composite. In still further embodiments the composite of the invention is used as a packaging material for moisture sensitive materials and articles. Thus, the light transparent properties of the thin film, multilayer composite when used as a moisture barrier for an on-cell tester enable one to see the condition of the cell as exhibited by color, indicia or other visual means used by the tester to indicate the cell condition. In one embodiment in which the composite of the invention is used as a moisture barrier for an on-cell tester for an electrochemical cell, the substrate is a flexible polymer and the composite is a flexible, light transparent, thin film composite in which the thickness of each of the layers is no greater than five microns and preferably no greater than one micron. By on-cell tester is meant a tester which visually indicates the cell condition and is permanently attached to the cell either by means of the cell label or other means, although the invention is not limited to this embodiment. One type of a moisture sensitive on-cell tester for which the moisture barrier composite of the invention is useful is a tester which includes at least one hygroscopic material which, if it absorbs water vapor, impairs or destroys the effectiveness of the tester. Another type is a tester which includes at least one component requiring the presence of a predetermined amount of water to function and which therefore needs a moisture barrier to maintain that level of water in the tester.

Both the inorganic material and the organic material are solid and, with the exception of silicon, are compounds and not elements. The organic material is generally a polymer and, with the exception of silicon, the inorganic material is nonmetallic is a compound such as nitride, oxide, etc. Silicon is not generally regarded as a metal due to its electrically semiconducting nature. Both the inorganic and the organic materials are water insoluble and have as low a water vapor permeation rate as possible for moisture barrier applications, and in these applications the organic material preferably comprises a hydrophobic polymer. The process for making the multilayer composite comprises depositing or forming a first layer on a substrate, followed by depositing a second layer over the first layer, wherein the first and second layers are different materials with one being the organic material and the other being the inorganic material, and repeating the alternating layer deposition until the number of layers required to produce a multilayer composite having the desired properties have been applied. Thus, the composite of the invention is distinguished from laminates in which various pre-existing layers are adhesively or otherwise bound to each other in that the alternating layers of the composite of the invention are formed in-situ on the substrate or other layers of the composite by deposition or coating processes. The organic material is applied as a liquid and then cured or dried or it is applied as a monomer, prepolymer or polymer by physical vapor deposition (PVD) processes, sputtering, plasma-enhanced physical vapor deposition, chemical vapor deposition or any other suitable means. The inorganic layers are also applied by processes known to those skilled in the art and include various (PVD) processes, sputtering, plasma-enhanced physical vapor deposition, chemical vapor deposition (CVD) and other suitable processes depending on the materials used, as will be described further below.

DETAILED DESCRIPTION

Figure 1:
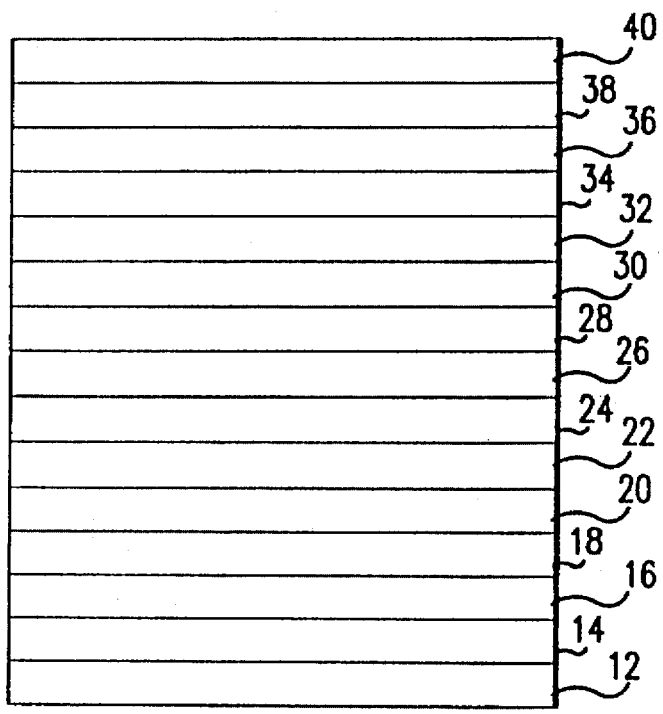
FIG. 1 schematically illustrates a fourteen layer moisture barrier according to the invention.

FIG. 1 schematically illustrates a thin film, multilayer moisture barrier 10 of the invention as comprising a plastic or polymeric substrate 12 on which is deposited a multilayer structure comprising seven layers of inorganic material as layers 14, 18, 22, 26, 30, 34 and 38, and seven layers of organic material as layers 16, 20, 24, 28, 32, 36 and 40. The thickness of each of the organic layers is generally within the range of from about 100 angstroms to about 5 microns and preferably within the rage of from about 1000 angstroms to about 1 micron. The thickness of the inorganic layers is generally within the range of from about 100 angstroms to 10,000 angstroms, preferably within the range of from about 200 angstroms to 5,000 angstroms and still more preferable from about 300 to 3,000 angstroms. Thus, except for the use of layers of organic material and the use of a plastic substrate, the construction of the moisture barrier illustrated in FIG. 1 with respect to the alternating material construction and the thickness of the layers is similar to that of thin film, multilayer optical interference coatings used on lamps, lenses, reflectors and other optical articles. Also, the thickness of each of the layers being within these ranges is believed to place the composites of the invention in the thin film category. The number of layers and layer thicknesses will of course, depend on the intended use of the multilayer composite and on the materials used for the inorganic layers and the organic layers. In the particular construction illustrated in FIG. 1, all of the organic layers are of the sang thickness and are of the same material and all of inorganic layers are of the same thickness and of the same material. However, the invention includes multilayer composites in which not all of the inorganic layers are of the same thickness or of the same material and also in which not all of the inorganic layers are of the same thickness or of the same material, as will be appreciated by those skilled in the art. Also, although a fourteen layer (exclusive of substrate) composite is illustrated merely for the sake of convenience, the composite of the invention will have more or less layers, with the total number of layers (exclusive of the substrate) ranging between 3 to 100 or more, preferably at least 4 and still more preferably at least 6 alternating layers, at the discretion and capability of the practitioner. Further, in the embodiment illustrated in the figure, all of the layers are on one side of the substrate. If desired, alternating inorganic and organic layers are applied to both sides (top and bottom) of the substrate to form a composite of the invention.

Further, although the multilayer composite of the invention is useful as a thin film moisture barrier for on-cell electrochemical testers, it is also useful as a moisture barrier for moisture sensitive foods, chemicals, pharmaceuticals, electronics and articles as set forth above. Those skilled in the art will appreciate that it may also be designed and used for other applications, including optical applications such as selectively transmitting and reflecting various portions of the electromagnetic spectrum. In yet another embodiment, substrate 12 is a web having a releasable surface on which the first layer is deposited, so that the multilayer structure may be removed and used without the substrate on which it was formed or it may be formed on a first substrate and then transferred to a second substrate. For most applications a substrate is needed for strength to enable the multilayer composite to be handled and used in manufacturing processes without breaking. In the embodiment illustrated in FIG. 1, the substrate does not have a releasable surface, with the first layer applied to the substrate being the inorganic layer and the last layer applied being a layer of organic material. If desired, the first layer deposited on the substrate may be a layer of organic material and the last layer of the composite may be a layer of either inorganic or organic material, depending on the intended use. It has been found that if the inorganic material is a relatively brittle material or a material that is prone to cracking, such as a glass, metal oxide or metal nitride, coating it with a layer of organic material protects it from being damaged when handled, reduces its tendency to crack when bent or flexed and also protects the inorganic material from direct contact with corrosive environments. In this case, the outer layers of the composite are organic material, of which one may be a plastic or polymeric substrate as is illustrated in FIG. 1.

It has also been found, and is material to the practice of the invention, that it is important for the layers of inorganic material to be separated by organic material to avoid crack and defect propagation in the inorganic material. That is, it has been found that a crack, pinhole or other defect in an inorganic layer deposited by one of the deposition processes referred to below tends to be carried into the next inorganic material layer, if the next inorganic material layer is deposited directly onto the first layer of inorganic material with no intervening layer of inorganic material between the two inorganic layers. This phenomenon significantly reduces the usefulness of the composite as a moisture barrier, since such defects often propagate through all of the inorganic materials if no intervening layer of inorganic material is interposed between the inorganic layers. A similar phenomenon sometimes occurs with respect to organic materials deposited as layers according to the practice of the invention. Thus, a macroscopic or microscopic pinhole, inclusion of a dust particle, etc. can occur during the deposition process, and this provides a facile path for water vapor transmission. By alternately depositing inorganic material layers and organic material layers, such layer or film defects in any particular layer do not tend to propagate into the overlying layer which covers the defect, thereby providing a much longer and more tortuous path for the water vapor to go through, even to such an extent that the net result is as though such defects do not exist. From a technical view point, thinner layers and more layers provide more resistance to the transmission of water vapor through the composite. However, the cost of the moisture barrier increases with each layer that is deposited. Also, if the layers are too thin, there will be voids of incomplete coverage in the layers and this will increase the permeability of the composite.

As set forth above, the thin laminates of the composite of the invention is different from laminates of the prior art in that the layers of the invention are formed by alternately depositing the inorganic and organic materials over each other by means other than laminating by adhesively or otherwise bonding preformed ribbons or sheets of material to form a layered structure. Also, it is within the scope of the invention to have one or more organic layers which, of themselves are made of two or more layers of different organic materials, such as the use of a primer layer or coating over an inorganic material layer to achieve better interlayer adhesion, over which is deposited a different organic material, with the composite of the two different organic materials forming the organic layer. Similarly, two or more layers of inorganic material may he applied to form an inorganic layer in the context of the invention. It is also within the scope of the invention, and forms one embodiment thereof, that one or more composites of the invention (which are not laminated composites) may be laminated to each other or to other composites or materials, or combinations thereof, to form a laminated structure comprising at least one or at least two or more composites of the invention. Further, although the thin film multilayer composite of the invention does not include the use of metal layers, the composite of the invention may be laminated with one or more layers of metal, or one or more layers of metal may be deposited on the composite of the invention, with a further composite of the invention deposited over the metal layer to form a structure comprising alternating composites of the invention and layers of metal. Those skilled in the art will appreciate that metal coatings are light opaque. However, such structures are useful for applications which do not require light transmissive properties.

The layer deposition processes useful in the practice of the invention include the various PVD processes such as sputtering and evaporation, including radio frequency (RF) sputtering and magnetron sputtering. Also useful is plasma polymerization, monomer vapor deposition, various CVD, low pressure chemical vapor deposition (LPCVD) and plasma assisted chemical vapor deposition (PECVD) processes which are known to those skilled in the art. High speed methods for applying a coating or layer to a substrate on a roll or reel are also known and are disclosed, for example, in U.S. Pat. Nos. 4,543,275 and 5,032,461. Generally only one layer at a time is deposited in a vacuum chamber. Thus, for example, a layer of silica or silicon nitride is deposited onto one or both sides of the substrate. Then the target material in the vacuum chamber is changed to a polymer or the silica coated substrate is transferred to another chamber in which the target material is the polymer. The polymer is then deposited as a layer over the silica layer(s). If desired however, at least one layer of inorganic material and at least one layer of polymer are deposited on one or both sides of the substrate within one vacuum chamber by employing in the chamber, at least two deposition sputter targets (in the case of sputter deposition) targets. For example, in a vacuum chamber in which the layer deposition occurs by magnetron enhanced sputtering, the substrate is one electrode and the target material to be deposited on the substrate is the other electrode, with the plasma inbetween the electrodes in the case of depositing a layer on one side of the substrate. Alternately, the target material and plasma are over both sides of the substrate for depositing a layer on both sides at the same time, in which case a layer of either inorganic material or organic material is deposited over both sides of the substrate or inorganic layer coated substrate. Further, if the substrate is a moving strip or film, then more than one material is deposited in one pass of the substrate by sequentially employing more than one target in the vacuum chamber. Thus, if the substrate is a moving strip or film, as the substrate moves past the first target or set of targets, a layer of inorganic material is deposited on one or both sides of the substrate. As the inorganic material coated substrate continues to move to the second target or set of targets in the chamber downstream of the first target(s), a layer of organic material is deposited over the layer of inorganic material, and so on. Thus, a multiple number of layers is applied to the substrate in one pass of the substrate in the vacuum chamber to form a composite illustrated in FIG. 1 or a composite having more or leas layers than that illustrated in FIG. 1.

Figure 2A:
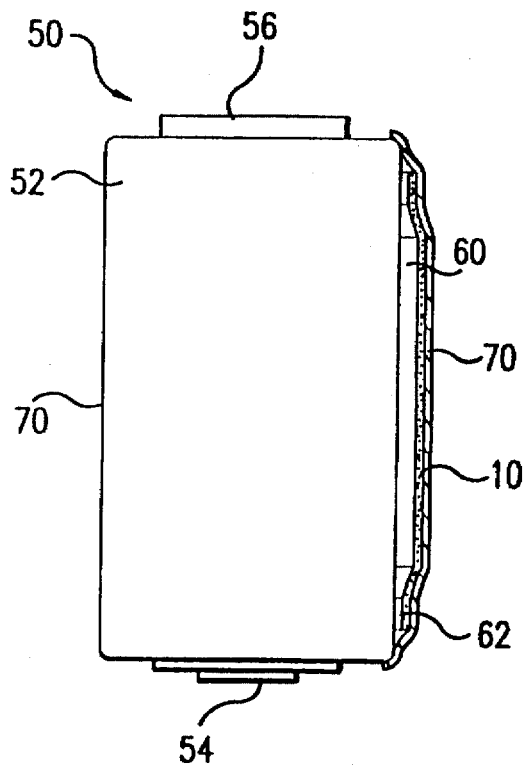
FIG. 2(a) schematically illustrates a cross-section of an on-cell tester on a cell with a moisture barrier of the invention and FIG. 2(b) schematically illustrates, in partial phantom, a side view of a cell having an on-cell tester and a moisture barrier of the invention.
Figure 2B:
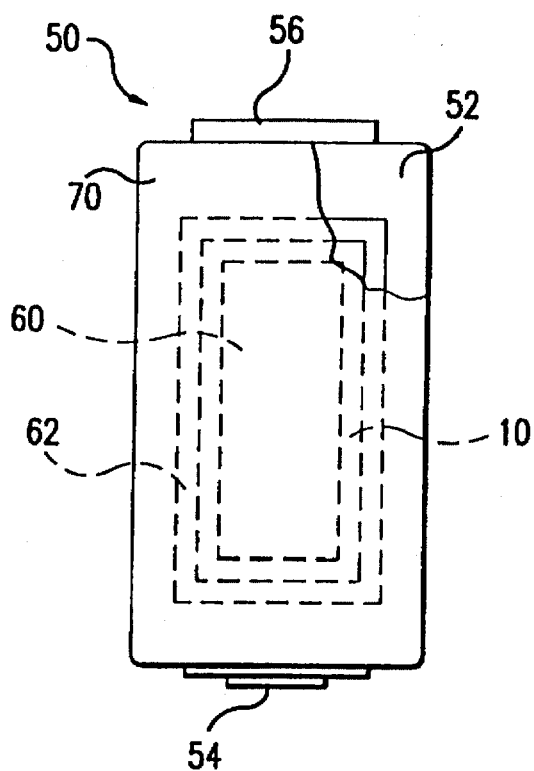

As set forth above, U.S. Pat. Nos. 5,250,905 and 5,339,024 disclose on-cell testers which may contain one or moisture sensitive components which therefore requires that a moisture barrier be employed in conjunction with the moisture sensitive tester to prevent moisture from impairing the effectiveness of the tester as disclosed in U.S. Pat. No. 5,355,089. One method which has met with some success is the use of a small sheet of mica disposed over the on-cell tester and sealed by means of a suitable moisture resistant material, such as polyisobutylene, as disclosed in the '089 patent. FIGS. 2(a) and 2(b) schematically illustrate a side view of an on-cell tester on a cell with a moisture harrier of the invention and a top view in partial phantom, respectively. Thus, FIG. 2 schematically illustrates an electrochemical cell 50 having an on-cell tester 60 of the type disclosed in the '089 patent and which contains at least one hygroscopic component (not shown), with a thin film, multilayer moisture barrier of the invention 10 disposed over the tester and sealed to the outside of the metal cell container 52 by means of sealant 62 and with plastic label 70 wrapped around the cell and disposed over the tester, seal and moisture barrier. Tester 60 is about 10 mils thick and is attached to the positive 54 and negative 56 terminals of the cell by means not shown. As disclosed in the '089 patent, tester 60 contains, for example, an aprotic organic electrolyte such as 0.5M lithium trifluoromethanesulfonate in a 2.4:2.4:5.2 parts by volume solvent mixture of ethylene carbonate:propylene carbonate:polyvinylidine fluoride, which is very hygroscopic. The sealant material is, for example, a maleic anhydride modified polybutylene elastomer available a Vestoplast V3645 from Huls, Inc. in Piscataway, N.J. The label is a PVC film wrapped around the cell and moisture barrier/tester/sealant and then heat shrunk. As a practical matter, for use as a moisture barrier for an on-cell tester on an electrochemical cell, such as the on-cell label testers disclosed in the patents referred to above, the total thickness of the moisture barrier, including the substrate, is no greater than about one and one-half mils and preferably within about one mil or 25 microns.

In the embodiment illustrated in FIG. 2, the moisture barrier of the invention 10 comprises a one mil thick polyethylene naphthenate film as the substrate over which has been deposited fourteen alternating layers of inorganic material and organic material as is illustrated in FIG. 1 to yield a moisture barrier 1.3 mils thick and having a moisture vapor transmission rate of less than 5 micrograms of water per square inch of surface area over a twenty four hour period measured according to the procedure set forth below.

The seven inorganic layers are all 500 angstrom thick layers of a water resistant glass having a relatively low melting temperature of about 350° C., each layer of which is deposited by sputtering. The seven organic layers are each a monochlorinated, di-paraxylylene polymer one micron thick, with each layer being deposited over a glass layer by vapor phase polymerization of monochlorinated paraxylylene monomer onto each layer of sputtered glass. The first layer deposited onto the substrate is the glass and the last or fourteenth layer is the polymer, as illustrated in FIG. 1. Thus, both sides of each glass layer are covered with a layer of organic material, one of which is the monochlorinated, di-paraxylylene polymer and the other of which is the substrate.

The water permeation of the multilayer moisture barrier is measured by placing a strip of anhydrous polyvinylidene fluoride 0.25 inches wide and 3 mils thick and which contains 70 wt. % sulfolane, along with an aprotic organic electrolytic such as 0.5M lithium trifluoromethanesulfonate in a 2.4:2.4:5.2 parts by volume solvent mixture of ethylene carbonate:propylene carbonate:polyvinylidine fluoride, which is very hygroscopic, onto 0.5M mil thick aluminum foil, over which is applied a 1 inch wide and 1.7 inch long rectangle of the moisture barrier of the invention which is sealed to the aluminum foil by a sealant 2.5 mils thick, as generally illustrated in FIG. 2. The seal is a maleic anhydride modified polybutylene elastomer. This assembly is done under anhydrous conditions in a sealed glove box. The so-formed laminate is then kept at 60° C. and 100% relative humidity for one week, after which the sulfolane containing strip of polyvinylidine fluoride is removed and analyzed for water content by Karl Fischer titrometry. This is the test method and test conditions referred to and used in the examples below. A moisture barrier of the invention will have a moisture vapor transmission rate of less than 15 and preferably less than 5 and still more preferably less than 2 micrograms of water per square inch of surface area over a twenty four hour period measured according to this test procedure and conditions.

In making a multilayer, thin film composite of the invention useful as a moisture barrier for an on-cell tester, the layers are deposited on a flexible substrate, such as a flexible polymer film in the form of a ribbon, strip or web, or other suitable substrate material. The substrate need not be flexible, although in making the multilayer composite of the invention for use as a moisture barrier, a flexible substrate is preferred so as to withstand bending during the manufacturing process of the barrier and its application to the cell. The first layer deposited onto the substrate is generally the inorganic layer, although the organic material may, if desired be applied as the first layer. By way of an illustrative, but nonlimiting example of the process of the invention, a first layer of inorganic material is deposited on the substrate and a first layer of organic material is deposited over the first layer of inorganic material. A second layer of inorganic material is then deposited over the first layer of organic material. After this, a second layer of organic material is deposited over the second layer of inorganic material. A third layer of inorganic material is then deposited over the second layer of organic material and a third layer of organic material is deposited over the third layer of inorganic material. This alternating layer deposition is repeated until the desired number of layers has been achieved, as illustrated in FIG. 1. Although FIG. 1 illustrates a total of fourteen layers or seven layer pairs, the actual number of layers will depend on the application and the materials used and, in the broadest sense, the multilayer composite of the invention may be used for applications other than as a moisture barrier and the number of layers may vary from four to more than a hundred.

The inorganic layer is a solid, inorganic compound such as, an oxide, nitride, carbide, phosphide or phosphate, etc. and mixtures of such compounds of at least one element selected from the group consisting essentially of metal, silicon, boron, arsenic and mixture thereof. In one embodiment the inorganic material is silicon. For example, the inorganic compound will be a nitride, phosphide, phosphate, oxide, carbide, oxyhalide, borate, silicate, tungstate, etc. and mixtures thereof. An illustrative, but nonlimiting example of an embodiment in which the inorganic layer is a mixture of inorganic compounds is a moisture resistant glass comprising a tin-lead-phosphorous-oxyfluoride composition applied by a PVD sputtering process. Other moisture resistant glass compositions are useful, with illustrative, but non-limiting examples including boro-phospho-silicates, silicates, phosphates, arsenates, vanadates, niobiates, tantalates, tungstates, borosilicates, aluminosilicates, calchoginide glass such as sulfide, selenide, tellurides, etc. In another embodiment it is a nitride such as amorphous silicon nitride or any suitable metal nitride, a single oxide as $SiO_x$, $Al_2O_3$, $Nb_2O_5$, or a compound such as $Si_xN_yO_z$, or one or more intermetallic compounds, etc. For use in a moisture barrier for an on-cell tester according to the invention, the inorganic layer is stable in the presence of moisture and has some degree of flexibility so as to enable the multilayer composite to be bent without cracking the inorganic layer and thereby diminishing the effectiveness of the composite as a moisture barrier. In moisture barrier applications, the inorganic compound is water insoluble, which means that it will have a water dissolution rate of less than $1\times10^{-4}$ $g/cm^2$-min. at 25° C., preferably less than $1\times10^{-5}$ $g/cm^2$-min. at 25° C. and still more preferably less than $1\times10^{-6}$ $g/cm^2$-min. at 25° C. The organic layer is a solid and most generally a polymeric material The polymeric material is amorphous or crystalline, elastomeric, cross-linked or not cross-linked, etc., depending on the use of the composite and the environment to which it is exposed in use. Examples of some suitable organic materials include microcrystalline waxes, condensed aromatics, polyolefins, polyvinyl chloride and copolymers thereof, polyxylylenes, fluoropolymers and copolymers, elastomers, polyimides, polyamides, epoxies, polyesters, polyethers, polycarbonates, halogenated polymers, etc., as illustrative, but nonlimiting examples. Halogenated polymers, including fluoronatal carbon polymers, are also useful in the practice of the invention. Acrylic polymers are useful in the practice of the invention and particularly acrylic polymers having hydrocarbon chains of at least six carbon atoms, such as acrylic polymers formed from a reaction in which the monomer(s) include hexylmethacrylate and/or hexylacrylate, etc. Solid organic materials that are not polymeric which are useful in the practice of the invention include, for example, methyl stearate, stearic acid and the like. For use in a moisture barrier, the organic material is preferably hydrophobic, stable in a humid environment, and with as low a permeability to moisture or water vapor as possible. For a moisture barrier application the organic material layer has a moisture permeability less than 20 gm-mil/100 $in^2$-24 hr, preferably less than 10 gm-mil/100 $in^2$-24 hr and more preferably less than 1 gm-mil/100 $in^2$-24 hr at 100° F. and 90% RH as measured by ASTM F 372-78 which appears in volume 15.09 of the 1994 Annual Book of ASTM Standards. The organic layer is deposited by flow coating, by condensation, by reaction of monomers or prepolymers, by PVD such as sputtering, by CVD, and any of the other methods generally referred to above, depending on the desired properties of the composite, the nature of the organic layer and the deposition process used as will he appreciated by those skilled in the art.

The invention will further understood by reference to the examples below, in all of which the moisture barrier is light transparent.

EXAMPLES

Example 1

In this example a 1 mil thick film of polyethylene naphthenate (Kalodex) is the substrate and is sputter coated in 1.5 millitorr of argon with a moisture resistant glass to form a 500 Angstrom thick glass layer on the film. The glass has a melting point of about 350° C. and is prepared by melting, at 500° C. for 30 minutes, a batch having the composition $SnO:SnF_2:PbO:P_2O_5$ in a ratio of 32:37:8:23. After this, the glass layer is coated with a 1 micron thick layer of a monochlorinated di-paraxylylene polymer by heating solid, monochlorinated di-paraxylylene dimer (Parylene C from Union Carbide) to a temperature of about 160° C. to vaporize the dimer, passing the vapors through a heat tube to break the dimer into monomer at about 600° C. and passing the so-formed monomer into a vacuum chamber having a pressure of 20 Torr and a temperature of about 30° C. in which the monomer condenses and polymerizes in-situ on tie glass-coated substrate to form a 1 micron thick layer or coating of the polymer directly on the glass layer. This polymer is a linear, uncrosslinked, primarily hydrocarbon type of polymer. This alternating layer deposition process is repeated two more times to form a six alternating layers of the glass and the polymer (3 glass and 3 polymer) on the substrate and the so-formed thin film, multilayer moisture barrier has a water vapor transmission rate of 52 micrograms of water per square inch of surface area over a 24 hour period as determined by the test method referred to above under DETAILED DESCRIPTION.

Example 2

Example 1 is repeated, but with a total of ten alternating layers (5 glass and 5 polymer) of the glass and the polymer deposited on the substrate to form a moisture barrier which has a water vapor transmission rate of 24 micrograms of water per square inch of surface area over a 24 hour period as determined by the test method referred to above under DETAILED DESCRIPTION.

Example 3

Example 1 is repeated again, but with fourteen alternating layers of the glass and the polymer (7 glass and 7 polymer) to form a moisture barrier as illustrated in FIG. 1 which has a water vapor transmission rate of 4.7 micrograms of water per square inch of surface area over a 24 hour period as determined by the test method referred to above under DETAILED DESCRIPTION.

Example 4

In this example a 1 mil thick film of polyethylene naphthenate (Kalodex) is the substrate and is RF magnetron sputter coated in 1.5 millitorr of argon with silicon dioxide to form a layer or coating of $SiO_x$ about 500 angstroms thick. TIC $SiO_x$ coated substrate in then dip coated into a vinylether monomer (Vectomer, Allied-Signal) solution in MIBK containing a trivinylmethylsilane adhesion promoter and Cyracure 6974 (triarylsulfonium salt) UV initiator. The wet coated composite is exposed to UV radiation for several seconds and cured into a dry polyvinylether coating 3 microns thick. This alternating layer deposition procedure is repeated six more times to form 14 alternating layers on the substrate (7 $SiO_x$ and 7 polymer) as illustrated in FIG. 1, resulting in a 2 mil thick transparent moisture barrier which is tested using the test procedure in Example 1 and has a water vapor transmission rate of 21 micrograms of water per square inch of surface area over a 24 hour period as determined by the test method referred to above under DETAILED DESCRIPTION.

Example 5

In this example a 1 mil thick film of polyethylene naphthenate (Kalodex) is the substrate and is RF magnetron sputter coated in 1.5 millitorr of argon with the glass of Example 1 to form a glass layer 500 Angstrom thick on the film. After this, the glass layer is sputter coated with a 1 micron thick layer of a polyvinylether as described in Example 4 above (Vectomer 40105F, Allied-Signal). This alternating layer deposition process is repeated six more times to form a moisture barrier having fourteen alternating layers of the glass and polyvinylether on the substrate (7 glass and 7 polyvinylether) as illustrated in FIG. 1 and the moisture barrier has a water vapor transmission rate of 28 micrograms of water per square inch of surface area over a 24 hour period as determined by the test method referred to above under DETAILED DESCRIPTION.

Example 6

In this example a 1 mil thick film of polyethylene naphthenate (Kalodex) is the substrate and is RF magnetron sputter coated in 1.5 millitorr of argon with the glass of Example 1 to form a glass layer 500 Angstrom thick on the film. After this, the glass layer is RF magnetron sputter coated with a 1 micron thick layer of a polychlorotrifluoroethylene (Aclar, Allied-Signal). This alternating layer deposition process is repeated six more times to form a moisture barrier having fourteen alternating layers of the glass and polyvinylether on the substrate (7 glass and 7 polyvinylether) as illustrated in FIG. 1 and the moisture barrier has a water vapor transmission rate of 28 micrograms of water per square inch of surface area over a 24 hour period as determined by the test method referred to above under DETAILED DESCRIPTION.

Example 7

In this example a 1 mil thick film of polyethylene naphthenate (Kalodex) is the substrate and is RF magnetron sputter coated in 1.5 millitorr of argon with silicon nitride to form a layer or coating of amorphous silicon nitride about 500 angstroms thick. PTFE is then RF magnetron sputtered onto the silicon nitride layer to form a PTFE layer one micron thick. This process is repeated once to form a thin film, multilayer moisture barrier comprising four alternating layers of amorphous silicon nitride and PTFE (2 silicon nitride and 2 PTFE) on the substrate which has a water vapor transmission rate of 28 micrograms of water per square inch of surface area over a 24 hour period as determined by the test method referred to above trader DETAILED DESCRIPTION.

Example 8

In this example 1 mil thick film of polyethylene naphthenate (Kalodex) is the substrate and is RF magnetron sputter coated in 1.5 millitorr of argon on one side with a 500 angstrom thick coating of amorphous silicon nitride. After this, the silicon nitride layer is coated with a 1 micron thick layer of a monochlorinated di-paraxylylene polymer by heating solid, monochlorinated di-paraxylylene dimer (Parylene C from Union Carbide) to a temperature of about 160° C. to vaporize the dimer, passing the vapors through a heat tube to break the dimer into monomer at about 600° C. and passing the so-formed monomer into a vacuum chamber having a pressure of 20 Torr and a temperature of about 30° C. in which the monomer condenses and polymerizes in-situ on the glass-coated substrate to form a 1 micron thick layer or coating of the polymer directly on the glass layer. This polymer is a linear, uncrosslinked, primarily hydrocarbon type of polymer. This alternating layer deposition process is repeated three more times to form eight alternating layers of the silicon nitride and the polymer (4 silicon nitride and 4 polymer) on tit substrate and the so-formed thin film, multilayer moisture barrier has a water vapor transmission rate of 52 micrograms of water per square inch of surface area over a 24 hour period as determined by the test method referred to above under DETAILED DESCRIPTION.

Comparative Example A

In this example a 1 mil thick film of polyethylene naphthenate (Kalodex) is the substrate and is RF magnetron sputter coated in 1.5 millitorr of argon with silicon dioxide to form a layer or coating of $SiO_x$ about 500 angstroms thick. A layer of PTFE 1 micron thick is then RF magnetron sputtered onto the $SiO_x$. This alternating layer deposition process is repeated four more times to form a composite moisture barrier comprising ten alternating layers of $SiO_x$ and PTFE (5 $SiO_x$ and 5 PTFE) on the substrate and the moisture barrier has a water vapor transmission rate of 570 micrograms of water per square inch of surface area over a 24 hour period as determined by the test method referred to above under DETAILED DESCRIPTION.

Comparative Example B

In this example a 1 mil thick film of polyethylene naphthenate (Kalodex) is the substrate and is RF magnetron sputter coated in 1.5 millitorr of argon with silicon dioxide to form a layer or coating of $SiO_x$ about 500 angstroms thick. A layer of crosslinked polyethylene 1 micron thick is then sputtered onto the $SiO_x$ by plasma-enhanced CVD of methane. This alternating layer deposition process is repeated four more times to form a thin film, multilayer moisture barrier comprising ten (5 of $SiO_x$ and 5 of polyethylene) alternating layers of $SiO_x$ and polyethylene on the substrate which has a water vapor transmission rate of 340 microgram of water per square inch of surface area over a 24 hour period as determined by the test method referred to above under DETAILED DESCRIPTION.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. A light transparent, multilayer composite comprising at least three alternating layers of a water insoluble inorganic material selected from the group consisting of at least one inorganic compound, silicon and mixture thereof and a water insoluble organic material wherein the thickness of said inorganic compound layers and said organic compound layers ranges between about 100 to 10,000 angstroms and between about 100 angstroms to 5 microns, respectively.

2. A composite according to claim 1 wherein the number of said alternating layers is at least four.

3. A composite according to claim 1 having a moisture vapor transmission rate no greater than 15 micrograms of water per square inch of surface area over a twenty four hour period.

4. A composite according to claim 2 in which the outer layers are polymeric.

5. A composite according to claim 4 having at least three layers of said inorganic material and at least three layers of said organic material.

6. A composite according to claim 1 in which said organic material is hydrophobic.

7. A composite according to claim 6 in which said inorganic material comprises a glass.

8. A composite according to claim 7 wherein said glass comprises a tin-lead-phosphor-oxyfluoride.

9. A composite according to claim 8 having a moisture vapor transmission rate no greater than 15 micrograms of water per square inch of surface area over a twenty four hour period.

10. A composite according to claim 1 wherein said organic material comprises an acrylic polymer having hydrocarbon chains of at least six carbon atoms.

11. A composite according to claim 1 wherein said inorganic material is selected from the group consisting essentially of a nitride, an oxide, and mixture thereof.

12. A composite according to claim 11 wherein said organic material comprises a hydrophobic polymer.

13. A composite according to claim 12 having a moisture vapor transmission rate no greater than 15 micrograms of water per square inch of surface area over a twenty four hour period.

14. A composite according to claim 13 having at least three layers of said inorganic material and at least three layers of said organic material.

15. A composite according to claim 14 having a moisture vapor transmission rate no greater than 5 micrograms of water per square inch of surface area over a twenty four hour period.

16. A composite according to claim 15 wherein said moisture vapor transmission rate is no greater than 2 of water per square inch of surface area over a twenty four hour period.

17. A composite according to claim 1 having a moisture vapor transmission rate no greater than 2 micrograms of water per square inch of surface area over a twenty four hour period.

18. A cell according to claim 17 wherein said organic material comprises a hydrophobic polymer.

19. A process for making a non-laminated, light transparent, multilayer, thin film composite comprising alternating layers of a water insoluble inorganic material selected from the group consisting of at least one inorganic compound, silicon and mixture thereof and a water insoluble organic material wherein the thickness of said inorganic compound layers and said organic compound layers ranges between about 100 to 10,000 angstroms and between about 100 angstroms to 5 microns, respectively, said process comprising depositing a first layer of said inorganic material on a substrate and then depositing a first layer of solid organic material on said first inorganic material layer, followed by depositing a second layer of said solid inorganic material onto said first layer of organic material and then depositing a second layer of said organic material on said second layer of said inorganic material.

* * * * *